May 30, 1944.  A. KATZOW  2,350,115
REFRIGERATING SYSTEM
Filed May 25, 1940
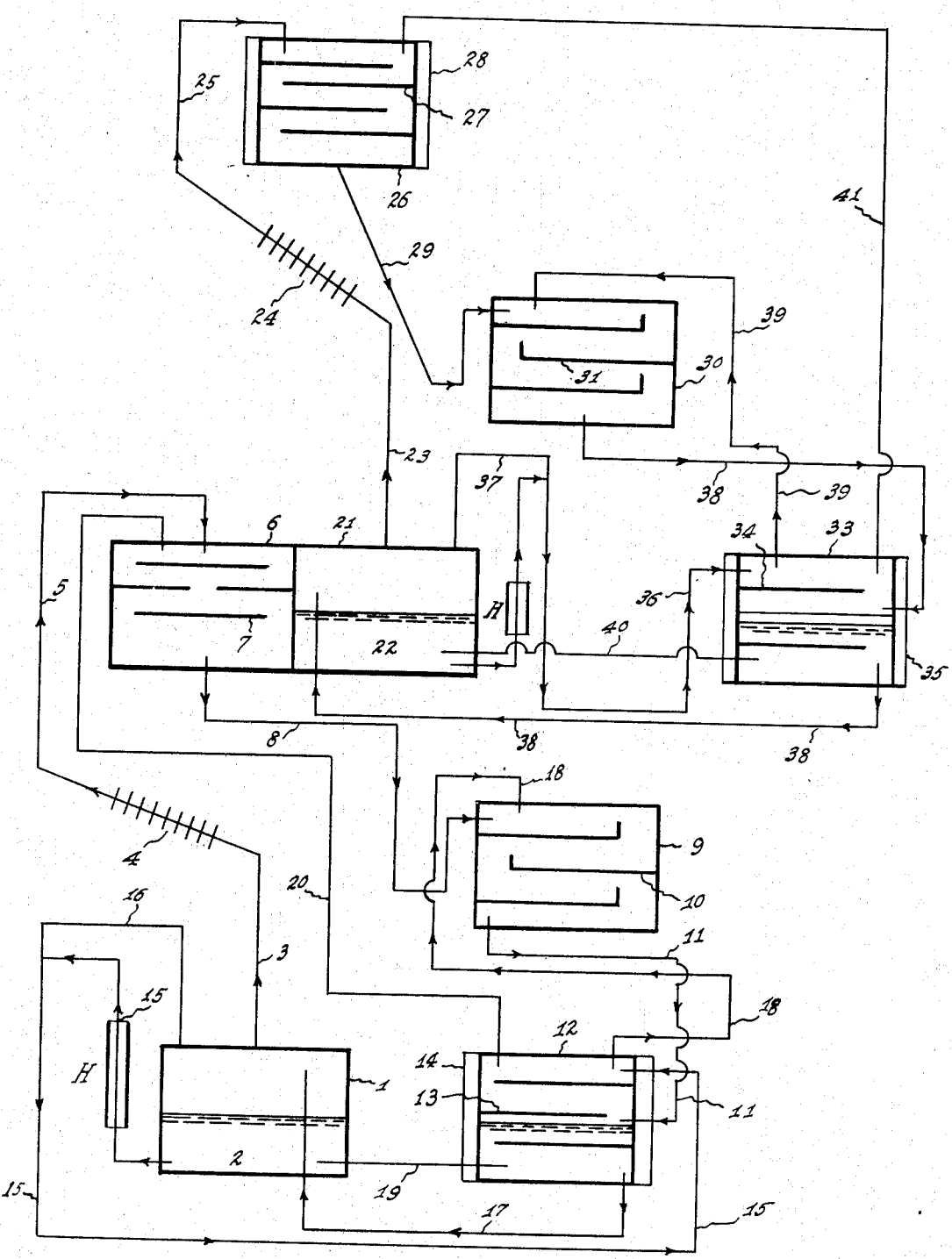
INVENTOR.
Abram Katzow Patented May 30, 1944

2,350,115

UNITED STATES PATENT OFFICE 2,350,115

REFRIGERATING SYSTEM

Abram Katzow, Indianapolis, Ind.

Application May 25, 1940, Serial No. 337,275

7 Claims. (Cl. 62—179)

This application relates to a method of and apparatus for producing refrigeration, and more specifically to a refrigerating system of the kind in which heat given off by a refrigerant in condensation is utilized to expel a refrigerant from a solution of refrigerant and absorbent.

Refrigerators are known in which heat extracted in an evaporator or its surroundings is given off in an absorber to expel a refrigerant in a secondary generator. In refrigerators of this kind the heat given off in the absorber vaporizes the absorbent (in the absorber) before any of such heat is available to expel a refrigerant from a solution in the secondary generator.

In carrying out my invention I increase the efficiency by expelling a refrigerant from solution in a secondary generator by utilizing heat added to a refrigerant in a primary generator. Preferably this is done by using two generators and one or two condensers with one generator and one condenser arranged in heat-exchanging relationship so that the heat taken up by a refrigerant in the primary generator and given up in the condenser may be used to expel a refrigerant from solution in the associated generator.

Other objects, novel features and advantages of the invention will be apparent as the description proceeds with reference to the accompanying drawing in which reference character 1 designates a generator, heated by any suitable manner, which contains, as indicated at 2, a solution of refrigerant dissolved in suitable absorbent. The generator is connected to a rectifier 4 by means of a conduit 3. The rectifier 4 is connected to a condenser 6 by means of a conduit 5. The condenser 6 may be provided with a series of baffling plates 7 to facilitate condensation of refrigerant. Refrigerant condensed in the condenser 6 passes by gravity through a conduit 8 which connects the condenser 6 with an evaporator 9, into the evaporator. Conveniently, the conduit 8 discharges the liquid refrigerant near the top of the evaporator 9 which is provided with a series of baffle plates 10 arranged to provide a large liquid surface within the evaporator. Evaporator 9 is connected by means of conduits 11 and 18 to an absorber 12. The absorber 12 is provided interiorly with series of baffles 13 and exteriorly with heat radiating fins 14 so that it may be cooled by atmospheric air. The lower part of the generator 1 is connected to the upper part of the absorber 12 by means of a conduit 15 through which absorption liquid passes from the generator 1 into the absorber 12. This conduit includes a loop which extends upwardly to a point above that at which absorption liquid enters the absorber. Conduit 16 connects the highest point of the loop with the vapor space of the generator 1. Conduit 17 connects the lower part of the absorber 12 with the upper part of the generator 1 and extends within the generator through the solution 2. Parts of conduits 15 and 17 form a temperature exchanger. The lower part of the generator 1 is connected to the lower part of the absorber 12 by means of a conduit 19. Vent conduit 20 connects the condenser 6 and the absorber 12. Disposed in heat exchanging relationship with the condenser 6 is a supplemental generator 21 containing, as indicated at 22, a solution of refrigerant in absorption liquid. The generator 21 communicates with a rectifier 24 by means of a conduit 23. The upper part of the rectifier 24 is connected to the condenser 26 by means of a conduit 25. Condenser 26 is provided interiorly with baffles 27 and exteriorly with heat radiating fins 28. Refrigerant condensed in the condenser 26 is discharged by gravity through a conduit 29 into the upper part of an evaporator 30, which is provided with a series of baffle plates 31 arranged to provide a large liquid surface within the evaporator. Evaporator 30 is connected by means of conduits 32 and 39 to an absorber 33. The absorber is provided interiorly with series of baffles 34 and exteriorly with heat radiating fins 35 so that it may be cooled by atmospheric air. It should be distinctly understood that the condenser 26 and absorbers 12 and 33 may be cooled by other means. The lower part of the generator 21 is connected to the upper part of the absorber 33 by means of a conduit 36 through which absorption liquid passes from the generator 21 into the absorber 33. This conduit includes a loop which extends upwardly to a point above that at which absorption liquid enters the absorber. Conduit 37 connects the highest point of the loop with the vapor space of the generator 21. Conduit 38 connects the lower part of the absorber 33 with the upper part of the generator 21 and extends within the generator through the solution 22. Parts of conduits 36 and 38 forms a temperature exchanger. The lower part of the generator 21 is connected to the lower part of the absorber 33 by means of a conduit 40 through which absorption liquid passes from the absorber into the generator when inert gas is to expand in the absorber or passes from the generator into the absorber 33 when the inert gas is to take up less space. Vent conduit 41 connects the condenser 26 and the absorber 33 for the purpose of passing inert gas from the condenser into the evaporator-absorber gas circuit.

Various substances may be used as refrigerant and absorbent in practicing my invention. As an example for purposes of illustration I may use ammonia as the refrigerant, water as the absorbent, and hydrogen as inert gas.

The operation of the invention is as follows:

Heat applied to the generator 1 expels ammonia from the solution 2. Expelled ammonia passes from the generator 1 through the conduit 3 into the rectifier 4 where carried over water vapor condenses, while ammonia vapor passes through the conduit 5 into the condenser 6. In condenser 6 the vapor is condensed by giving up its heat to a refrigerant in the associated generator 21. From the condenser 6 ammonia in liquid form gravitates through the conduit 8 into the upper part of the evaporator 9. The liquid ammonia entering the evaporator is spread over the baffling plates 10. In the evaporator ammonia evaporates in presence of hydrogen whereby heat is extracted from the surroundings of the evaporator (or, refrigeration is produced). From the evaporator 9 the mixture of ammonia and hydrogen gas passes through the conduit 11 into the absorber 12. In the absorber 12 the gas mixture comes into contact with absorption liquid supplied thereto from the generator 1 through the conduit 15, the result is an absorption of ammonia by water and liberation of hydrogen. In absorption heat is produced which is given off to the atmospheric air, by means of heat radiating fins 14. The circulation of absorption liquid is effected in the following manner:

Weak absorption liquid from the generator 1 enters the conduit 15 where it is heated. This heating develops a vapor which raises the liquid in the conduit to a level high enough to allow the liquid to flow by gravity into the upper part of the absorber 12. From the conduit 15 the vapor passes through the conduit 16 into the generator 1, and from the generator 1 through the conduits and rectifier into the condenser 6. The strong absorption liquid saturated with ammonia is carried from the absorber 12 through the conduit 17 due to influence of heat applied to a part of conduit 17 which in the case illustrated receives its heat from the same source as the generator 1.

Since hydrogen is lighter than the mixture of ammonia and hydrogen, the hydrogen passes from the absorber 12 through the conduit 18 into the evaporator 9 where it is again mixed with ammonia gas. Some of the inert gas entrapped in the solution is driven out in the generator. This inert gas passes into the condenser 6 and from the condenser 6 through the conduit 20 into the evaporator-absorber gas circuit.

The heat added to refrigerant in the generator 1 and then given up by the refrigerant in the condenser 6, however, is delivered to the generator 21 and tends to raise the temperature of such generator and of liquid contained therein. Owing to the temperature at which ammonia condenses in the condenser 6 the refrigerant is expelled from the solution 22 in the generator 21. Ammonia expelled from the generator 21 passes through the conduit 23 into the rectifier 24 and from the rectifier 24 through the conduit 25 into the condenser 26. In the condenser ammonia is condensed by giving up heat to the atmospheric air by means of heat radiating fins 28. From the condenser 26 ammonia in liquid form gravitates through the conduit 29 into the upper part of the evaporator 30. The liquid ammonia entering the evaporator 30 is spread over the baffling plates 31. In the evaporator, ammonia evaporates in the presence of hydrogen whereby heat is extracted from the surroundings of the evaporator (or, refrigeration is produced). From the evaporator 30 the mixture of ammonia and hydrogen gas passes through the conduit 32 into the absorber 33. In the absorber 33 the gas mixture comes into contact with absorption liquid supplied thereto from the generator 21 through the conduit 36, the result of which is absorption of ammonia into water and liberation of hydrogen. Since hydrogen is lighter than the mixture of ammonia and hydrogen, the hydrogen passes upwardly through the conduit 39 into the evaporator 30 where again ammonia diffuses into the hydrogen. Weak absorption liquid which passes from the generator 21 to the absorber 33, enters the conduit 36 where it is heated; this heating develops a vapor which raises the liquid in the conduit to a level high enough to allow the liquid to flow by gravity into the upper part of the absorber 33. The vapor developed in the conduit 36 passes from the conduit 36 through conduit 37 into the generator 21. Absorption liquid saturated with ammonia is carried from the absorber 33 through the conduit 38 due to influence of heat applied to a part of conduit 38 which in this case receives its heat from the same source as the generator 21. Some of the entrapped into solution inert gas is driven out in the generator. This inert gas passes from the generator into the condenser and from the condenser through the conduit 41 into the evaporator-absorber gas circuit.

While this invention involves various novel features it is to be understood that various changes may be made in the arrangement and construction of parts without departing from the spirit of the invention or the scope of the annexed claims.

Having thus described my invention, what I claim is:

1. That method in the art of refrigerating through the agency of an absorption system which includes continuously expelling volatile substance from a solution of volatile and relatively non-volatile substances, continuously condensing the expelled volatile substance at relatively high temperature while the volatile substance gives up heat, with this heat expelling refrigerant from a second solution of refrigerant and absorbent, liquefying the refrigerant from the second solution, and evaporating both the volatile substance and the liquid refrigerant at sub-atmospheric temperatures to produce refrigeration.

2. That method in the art of refrigerating through the agency of an absorption system which includes continuously expelling volatile substance, condensing the volatile substance while the volatile substance gives up heat, with this heat expelling refrigerant from a substance into which the refrigerant is absorbed, liquefying the expelled refrigerant, and evaporating both the liquefied volatile substance and the liquefied refrigerant at sub-atmospheric temperatures to produce refrigeration.

3. That improvement in the art of refrigerating through the agency of an absorption system which includes continuously evaporating volatile substance while removing heat from a body to be cooled, continuously absorbing the volatile substance into an absorbent while giving up heat to a cooling medium, continuously adding heat to expel the volatile substance from the absorbent, condensing the expelled volatile substance while the volatile substance gives up heat, and with this heat expelling a refrigerant from an absorbent.

4. That improvement in the art of refrigerating through the agency of an absorption system which includes continuously evaporating volatile substance while removing heat from a body to be cooled, continuously absorbing the volatile substance into an absorbent while giving up heat to a cooling medium, continuously adding heat to expel the volatile substance from the absorbent, condensing the expelled volatile substance while the volatile substance gives up heat, with this heat expelling refrigerant from absorbent, liquefying the expelled refrigerant while the refrigerant gives up heat to a cooling medium, and evaporating the liquefied refrigerant while removing heat from a body to be cooled.

5. That improvement in the art of refrigerating through the agency of an absorption system which includes continuously evaporating volatile substance at sub-atmospheric temperature to remove heat from a body to be cooled, continuously absorbing the volatile substance into absorption liquid while giving up heat to a cooling medium, continuously adding heat to expel the volatile substance from the absorption liquid, condensing the expelled volatile substance while the volatile substance gives up heat, with this heat expelling refrigerant from solution of refrigerant and absorbent, liquefying the expelled refrigerant while the refrigerant gives up heat to a cooling medium, evaporating the liquefied refrigerant while removing heat from a body to be cooled, and absorbing the gaseous refrigerant into the weakened solution of refrigerant and absorbent.

6. In refrigerating apparatus of the absorption type, main and supplementary generators each containing a solution of refrigerant and absorption liquid, means for heating said main generator to expel vaporous refrigerant therefrom, a main condenser receiving vaporous refrigerant from said main generator and arranged in heat-exchanging relationship with said supplementary generator whereby the heat of condensation expelled in said main condenser will expel refrigerant from the solution in said supplementary generator, a main evaporator receiving liquid refrigerant from the main condenser and containing a neutral gas, a main absorber connected to said main evaporator and receiving therefrom a mixture of gaseous refrigerant and neutral gas, means for cooling said main absorber, a supplementary condenser receiving vaporous refrigerant from the supplementary generator, a supplementary evaporator receiving liquid refrigerant from the supplementary condenser, and containing a neutral gas, a supplementary absorber connected to said supplementary evaporator to receive a mixture of gaseous refrigerant and neutral gas therefrom, means for cooling said supplementary condenser and absorber, means for circulating absorption liquid through the main generator and main absorber, and means for circulating absorption liquid through the supplementary generator and supplementary absorber.

7. That improvement in refrigerating through the agency of an absorbing system, which includes evaporating a volatile substance at sub-atmospheric temperature in the presence of an inert gas to remove heat from a body to be cooled, absorbing the evaporated volatile substance from a mixture containing it and the inert gas into an absorption liquid while the volatile substance gives up heat to a cooling medium, adding heat to expel the volatile substance from the absorption liquid, condensing the expelled volatile substance while the volatile substance gives up heat, and with this heat expelling a refrigerant from an absorbent.

ABRAM KATZOW.